US011883971B2

(12) United States Patent
Weschta et al.

(10) Patent No.: US 11,883,971 B2
(45) Date of Patent: Jan. 30, 2024

(54) ELECTRONIC PERSONAL CARE DEVICE

(71) Applicant: The Gillette Company LLC, Boston, MA (US)

(72) Inventors: Martin Weschta, Hanau (DE); Dominik Jueling, Schmitten (DE); Madeleine Ehrmann, Kronberg (DE); Judith Habermann, Frankfurt (DE)

(73) Assignee: The Gillette Company LLC, Boston, MA (US)

( * ) Notice: Subject to any disclaimer, the term of this patent is extended or adjusted under 35 U.S.C. 154(b) by 199 days.

(21) Appl. No.: 17/701,774

(22) Filed: Mar. 23, 2022

(65) Prior Publication Data

US 2023/0302674 A1 Sep. 28, 2023

(51) Int. Cl.
*B26B 21/40* (2006.01)

(52) U.S. Cl.
CPC .................................. *B26B 21/405* (2013.01)

(58) Field of Classification Search
CPC ... B26B 21/405; B26B 21/4087; B26B 21/46; B26B 21/40; B26B 19/3853; B26B 21/222
USPC .......................................................... 340/618
See application file for complete search history.

(56) References Cited

U.S. PATENT DOCUMENTS 8,510,958 B2 8/2013 Hart et al.
2008/0172880 A1* 7/2008 Freund .................. B26B 21/405 30/41.7
2009/0007433 A1* 1/2009 Hawes ................ B26B 21/4056 30/45
2010/0037463 A1* 2/2010 Maichel .............. B26B 19/3813 30/526
2012/0234658 A1 9/2012 Schnak et al.

FOREIGN PATENT DOCUMENTS

WO 2021032772 A1 2/2021

OTHER PUBLICATIONS

PCT Search Report and Written Opinion for PCT/US2023/064386 dated Jun. 13, 2023; 10 pages.

* cited by examiner

*Primary Examiner* — Eric Blount
(74) *Attorney, Agent, or Firm* — John M. Lipchitz

(57) ABSTRACT

An electronic personal care device with a housing defining a sealed cavity. A power source positioned within the sealed cavity of the housing. A first circuit board is positioned within the sealed cavity of the housing. A second circuit board positioned outside the sealed cavity and in electrical connection with the power source. A light guide is mounted to the second circuit board. The light guide having a body defining an opening. A light source is positioned within the opening, spaced apart from the light guide and mounted to the circuit board. A transparent adhesive layer is positioned around the light source and on the second circuit board forming water tight seal.

20 Claims, 5 Drawing Sheets

ELECTRONIC PERSONAL CARE DEVICE

FIELD OF THE INVENTION

The present invention relates to an electronic person care device and more particularly to a light guide assembly for small electronic appliances used in wet environments, such as a wet shaving razor or other grooming devices.

BACKGROUND OF THE INVENTION

Powered electronic devices are commonly provided with illuminated features that are aesthetically pleasing, indicate one or more functions of the device and provide feedback to a user. However, when such devices are used in a wet environment, providing such illuminated features can be problematic. Any electronic features that are not sealed from moisture may fail. The wet environment necessitates providing a water tight seal that increases the complexity and cost of the illuminated features as well as limits the aesthetics and functionality of the device. The seal can also limit assembly and installation of the illuminated features within the housing.

What is needed, then, is an electronic personal care device, suitable for use in a wet environment, with one or more illumination systems, for example, a light guide positioned on a handle. The electronic personal care device, including powered razors and toothbrushes, is preferably simpler, cost-effective, reliable, durable, easier and/or faster to manufacture, and easier and/or faster to assemble with more precision.

SUMMARY OF THE INVENTION

In one aspect, the invention features, in general, an electronic personal care device having a housing defining a sealed cavity. A first circuit board is positioned within the sealed cavity of the housing. A power source positioned within the sealed cavity of the housing. A second circuit board positioned outside the sealed cavity and in electrical connection with the power source. A light guide is mounted to the second circuit board. The light guide having a body defining an opening. A light source is positioned within the opening, spaced apart from the light guide and mounted to the second circuit board. A transparent layer is positioned around the light source and on the second circuit board forming a water tight seal.

In another aspect, the invention features, in general, An electronic personal care device with a handle having a housing defining a sealed cavity. A power source is positioned within the sealed cavity of the housing. A first circuit board is positioned within the cavity and operatively connected to the power source. A second circuit board is positioned outside the sealed cavity and in electrical connection with the power source. A light guide is mounted to the second circuit board. The light guide has a body defining an opening. A light source is positioned within the opening and spaced apart from the light guide. The light source is mounted to the second circuit board. A transparent layer is positioned around the light source and on the second circuit board.

DETAILED DESCRIPTION OF THE INVENTION

Figure 1:
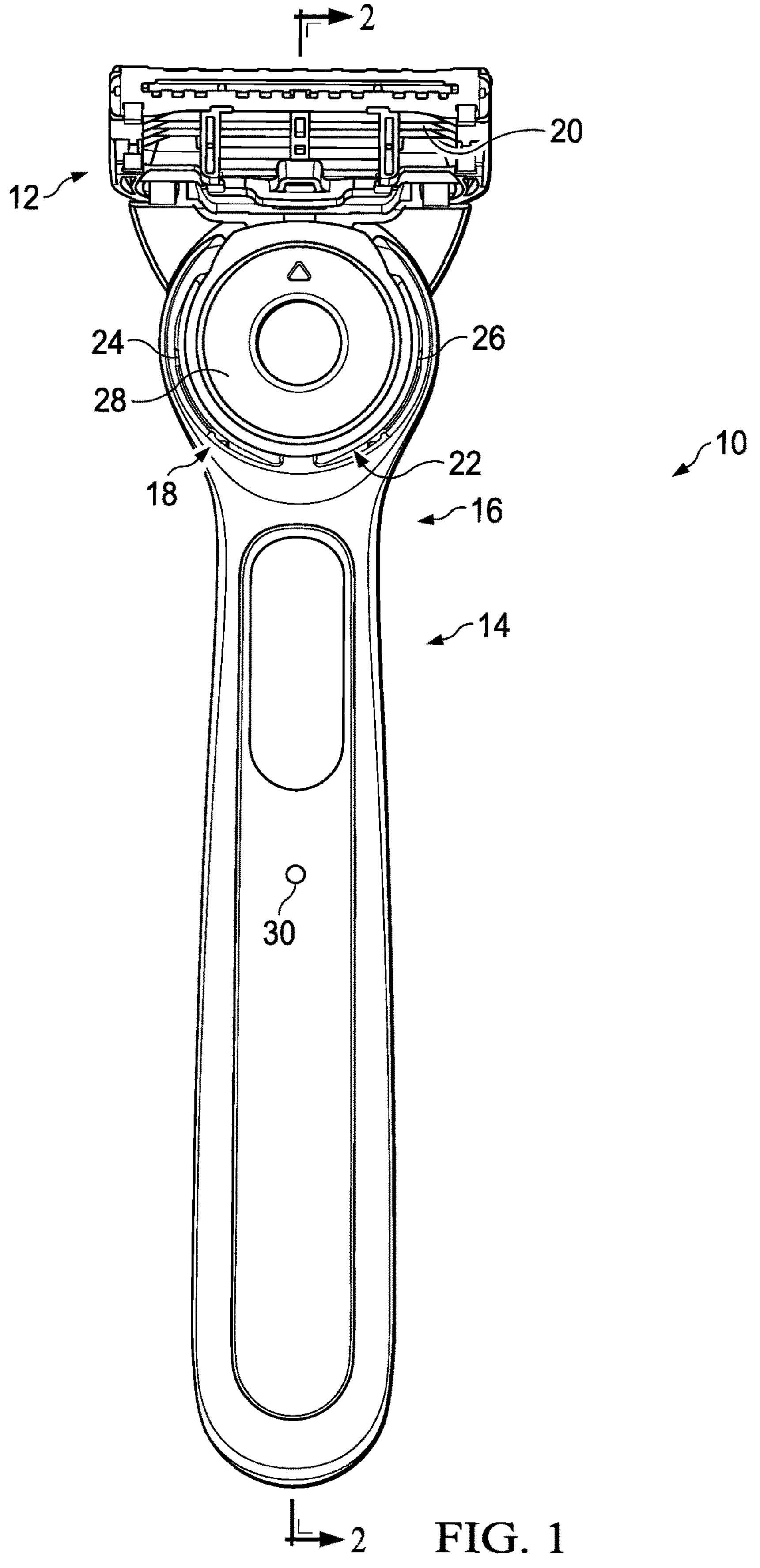
FIG. 1 is a top plan view of one possible embodiment of an electronic personal care device having an illumination assembly.

Referring to FIG. 1, one possible embodiment of the present invention is shown illustrating an electronic personal care device 10 that includes a cartridge 12 mounted to a handle 14 having a top portion 16 with a light assembly 18. Although a wet shaving system is shown, the light assembly 18 may be utilized on any electronic personal care device that may used in wet environments, such as tooth brushes or dry shaving razors. The cartridge 12 may carry at least one blade 20 for shaving or trimming hair on the surface of skin. The cartridge 12 may be fixed or pivotably movable relative to the handle 14. In certain embodiments, the cartridge 12 may be mounted detachably to the handle 14 to enable the cartridge 12 to be replaced when sharpness of the blade 20 has diminished to an unsatisfactory level. Although the light assembly 18 is illustrated as being located on the top portion 16 of the handle 14, the light assembly 18 may be located on any surface of the handle 14, such as a bottom surface, a side surface, or at the back of the handle 14.

The light assembly 18 may include a light guide 22, which may define a shape or symbol to communicate a function or status of the personal care device 10 (e.g., power is on or off). The light guide 22 may form the shape of various icons, symbols, letters, numbers, or trademarks may also be used to illustrate a function of the handle 14. The light guide 22 may also display an illuminated symbol that is as simple as a ring or a line, which may include only one symbol portion. The light guide 22 may be manufactured from a transparent or translucent material and may have two or more spaced apart arms 24 and 26 that direct light to a top surface of the light guide 22. The light guide 22 may be solid such that light travels through the material of the light guide 22 in order to exit the light guide 22 and not through a hollow or open space in the light guide 22. The light guide 22 may be exposed. For example, a seal member may not be positioned around the light guide 22 or between the light guide and the handle 14. In certain embodiments, the handle 14, may include a cover 28 spaced apart from the light guide 22. The handle 14 may include an actuator 30, such as a button or a switch, for turning on and off the light assembly 18.

Figure 2:
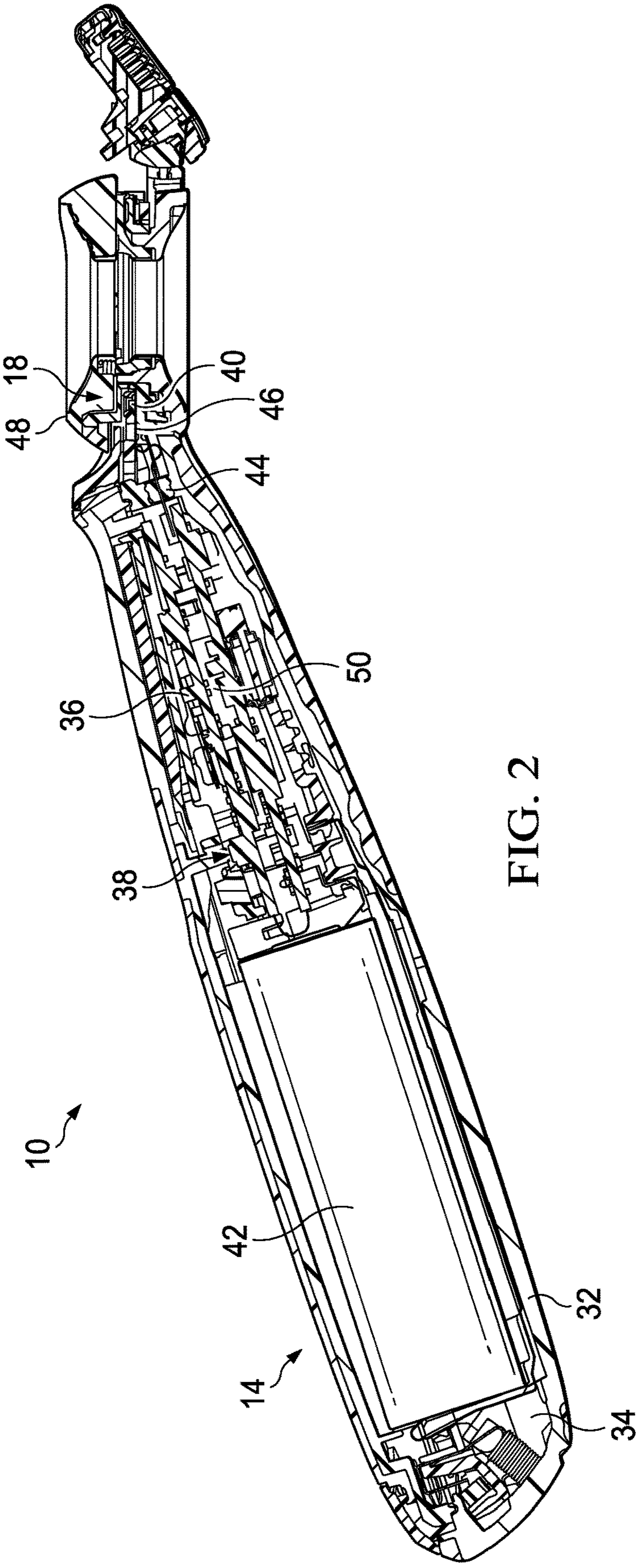
FIG. 2 is a is a cross sectional view of the electronic personal care device of FIG. 1, taken generally along the line 2-2.

Referring to FIG. 2, a cross sectional view of the electronic personal care device 10 of FIG. 1 is illustrated, taken generally along the line 2-2. The handle 14 may include a housing 32 that defines a sealed cavity 34 (i.e., water tight) to contain one or more electrical components. A circuit board 36 (e.g., a first circuit board) may be positioned within the sealed cavity 34 of the handle 14 to control one or more functions of the electronic personal care device 10. For example, the circuit board 36 may include an internal switch 38 for controlling the status of one or more light sources 40, such as an LED. The circuit board 36 may be a flexible or rigid printed circuit board (PCB). The internal switch 38 may be a push-button switch or any other electrically controllable and/or actuated component. The internal switch 38 may be operatively connected (e.g., allows travel of electric current) to a power source 42 (e.g., one or more batteries), the light source 40, and/or other electrical components, such as a motor (not shown). Although only a light source 40 is shown in FIG. 2, the internal switch 38 may also be operatively connected to other electronic devices. For example, the internal switch 38 may also be operatively connected to an oscillating motor and/or sensor(s), so when the internal switch 38 activates the light source 40, the motor and/or sensor(s) are also activated. The light source 40 may emit a white or colored light, such as blue or red.

The sealed cavity 34 of the handle 14 may prevent water ingress. In certain embodiments, the power source 42, the internal switch 38 and the circuit board 36 may be positioned within the sealed cavity 34 of the handle 14, with the light source 40 positioned outside of the sealed cavity 34. In certain embodiments, a seal 44 may be provided between the circuit board 36 and the handle 14 to prevent water ingress. For example, the seal 44 may be positioned completely around the circuit board 36 to prevent water ingress. As will be explained in greater detail below, the light source 40 (and the light assembly 18) may be mounted to and operatively coupled to another circuit board 46 (e.g., a second circuit board) positioned outside the sealed cavity 34. However, it is understood that the circuit board 36 and the circuit board 46 may be interconnected or a single piece construction. Accordingly, the power source 42 may be electrically connected to the circuit board 46 positioned within the sealed cavity 34 via the circuit board 46 positioned outside the sealed cavity 34. The light source 40 may be electrically connected to the circuit board 46. Accordingly, the electrical connection between the light source 40 and the circuit board 46 may be damaged by water. The circuit board 46 may be operatively connected to the circuit board 36. In certain embodiments, the cover 28 may be mounted to the handle 14 (e.g., a head 48 of the handle 14 that contains the light assembly 18) for aesthetic purposes (e.g., to block the view various components of the handle 14 and/or the light assembly 18). A microcontroller 50 may be mounted to the circuit board 36 positioned within the sealed cavity 34. The microcontroller 50 may be operatively connected to the internal switch 38, the power source 42 and the light source 40. Accordingly, the microcontroller 50 may control the status of the light source 40 and/or other components of the electronic personal device 10, such as a motor or heater.

Figure 3:
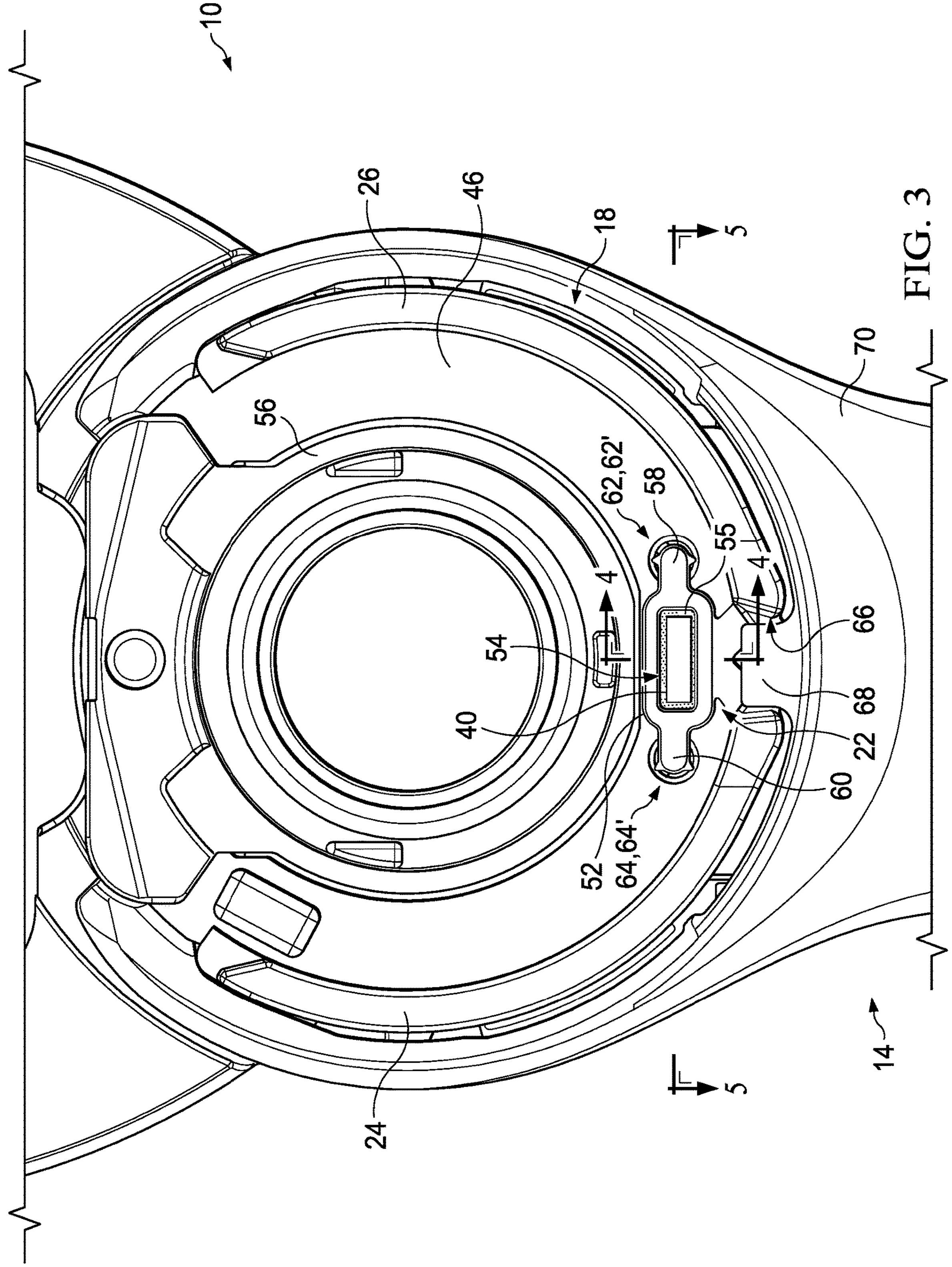
FIG. 3 is an enlarged top plan view of the handle of FIG. 1 with a portion of the handle assembly removed.

Referring to FIG. 3, an enlarged top plan view of electronic personal care device 10 of FIG. 1 is illustrated with a portion of the handle 14 removed for clarity. For example, the cover 48 (FIG. 2) may be removed to better show the light assembly 18. The light assembly 18 may include the light source 40 and the light guide 22 mounted to the circuit board 46 positioned outside the sealed cavity 34 of FIG. 2. The light guide 22 may have a body 52 defining an opening 54. The light source 40 may be positioned within the opening 54 defined by the body 52. For example, the light source 40 may be bounded by the body 52. The light source 40 may be spaced apart from the light guide 22 (e.g., the body 52). A transparent layer 55 may be positioned between the light guide 22 and the light source 40, as well as bond to the circuit board 46 to provide a water tight seal around the light source 40. The light guide body 52 may extend completely around the light source 40 to contain the transparent layer 55. The positioning of the transparent layer 55 on a portion of the circuit board 46 may prevent water ingress, which can damage electrical connections and components, such as the light source 40. Accordingly, the transparent layer 55 may form a watertight seal between the light source 40, the light guide 22 and the circuit board 46.

The circuit board 46 may be mounted to a platform 56 to provide structural support for the circuit board 46, which may include a flexible PCBs. In certain embodiments, the body 52 may have a pair of legs 58 and 60 that extend into a respective opening 62, 62' and 64, 64' of the circuit board 46 and the platform 56. The pair of legs 58 and 60 may facilitate securing the light guide 22 to the circuit board 46 and/or the platform 56. The pair of arms 24 and 26 may extend from the body 52 of the light guide 22 transverse to the pair of legs 58 and 60 (e.g., the legs 58 and 60 may be positioned or extend below the body 52 and/or the arms 24 and 26. The pair of legs 58 and 60 of the body 52 may extend through the openings 62, 62' and 64, 64' of the platform 56 and the circuit board 46 (see FIG. 5). The pair of legs 58 and 60 may align the light guide 22 with the circuit board 46 to facilitate the proper positioning of the light guide 22 relative to the light source 40. The pair of legs 58 and 60 may also facilitate securing the light guide 22 to the circuit board 46 and/or the platform 56. Accordingly, the transparent layer 55 may be positioned around the light source 40 to prevent the ingress of water without needing to be located within the sealed cavity 34 of the handle 14 (FIG. 2). The light guide 20 may define a notch 66 that engages a corresponding tab 68 on the handle 14 to properly position and secure the light guide 20. The arms 24 and 26 may extend along an outer surface 70 of the handle 14 as to be visible by a user.

Figure 4:
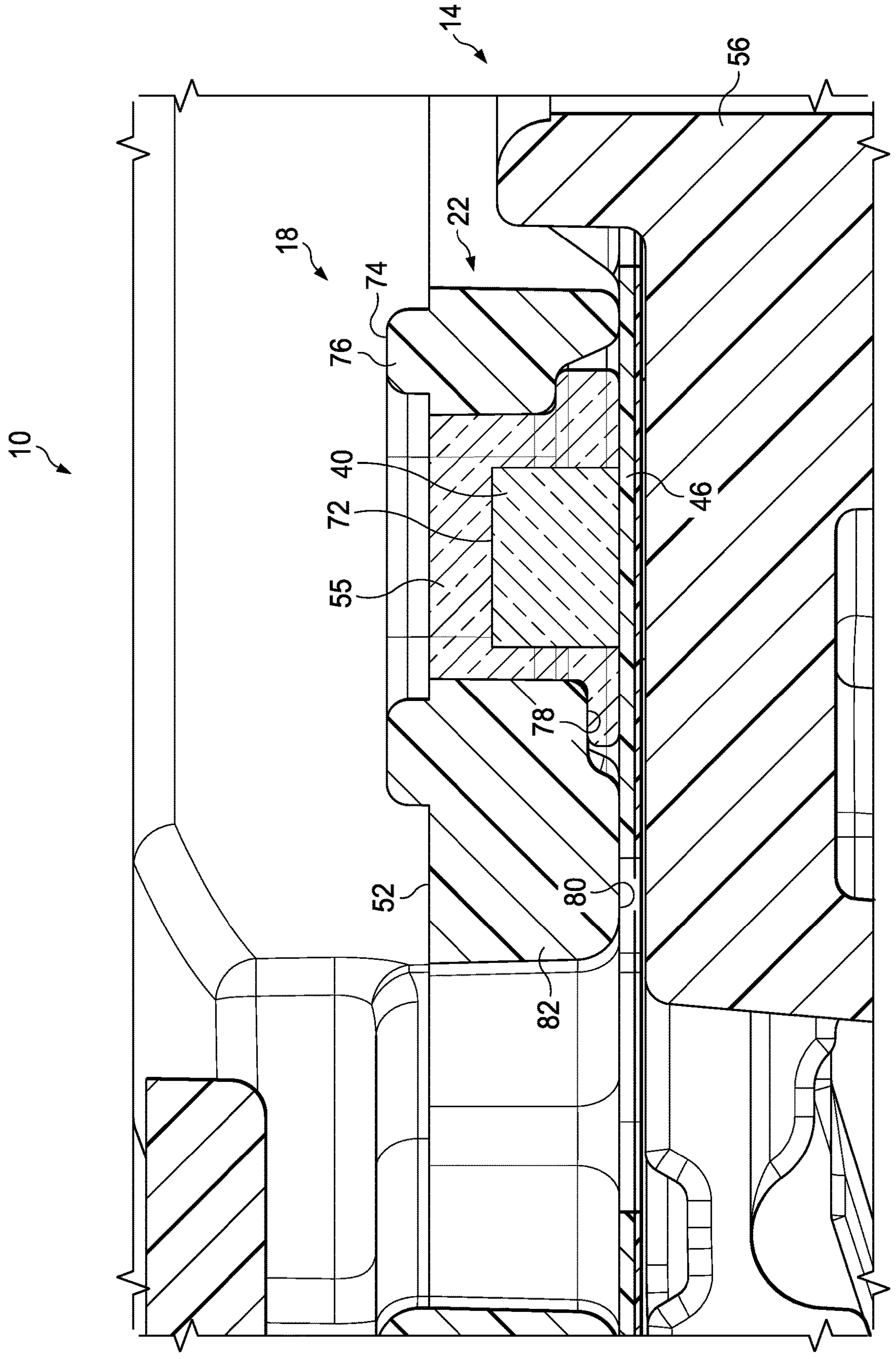
FIG. 4 is a cross sectional view of the electronic personal care device of FIG. 3, taken generally along the line 4-4.

Referring to FIG. 4, a cross sectional view of the electronic personal care device 10 of FIG. 3, taken generally along the line 4-4, illustrating the light assembly 18 of the handle 14. In certain embodiments, a top surface 72 of the light source 40 may be covered by the transparent layer 55. A top surface 74 of the body 52 of the light guide 22 may extend above the top surface 72 of the light source 40. The top surface 74 may include a upper rim 76 to contain the transparent layer. For example, the upper rim 76 may act as an indicator for the proper level of the transparent layer 55. An inner bottom surface 78 (portion spaced closest to the light source 40) of the body 52 may be spaced apart from the circuit board 46. A bottom surface 80 of an outer lower outer rim 82 of the body 52 may be direct contact with circuit board 46. Accordingly, the outer rim 82 may create an undercut surface to secure the transparent layer in place both mechanically, as well as increase the contact area with the circuit board 46. In certain embodiments, the bottom surface 80 of the outer rim 82 may not be bonded to circuit board 46. The circuit board 46 may be secured chemically (e.g., using adhesive) or mechanically to the platform 56.

Figure 5:
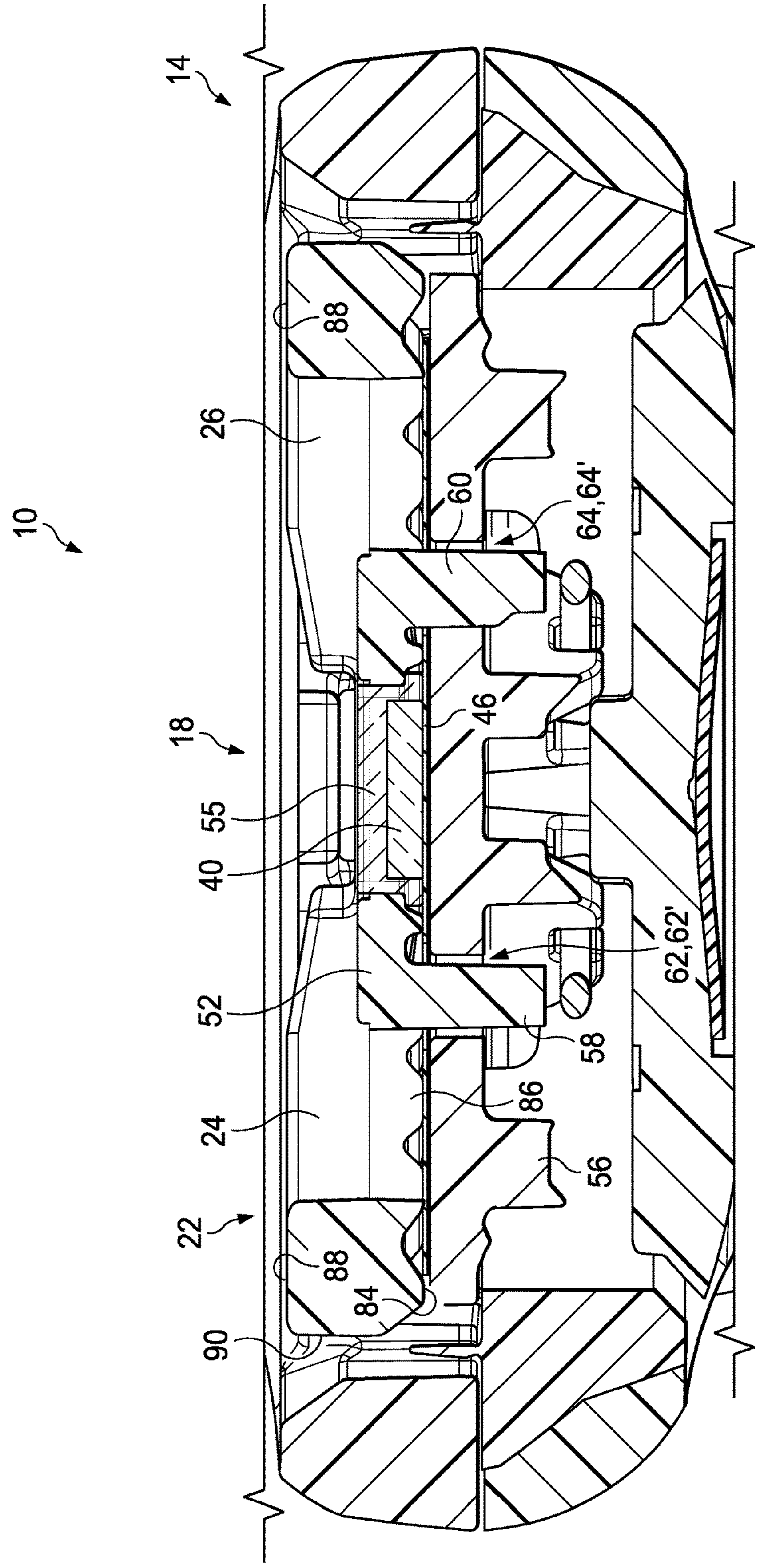
FIG. 5 is a cross sectional view of the electronic personal care device of FIG. 3, taken generally along the line 5-5.

Referring to FIG. 5, a cross sectional view of the electronic personal care device 10 of FIG. 3, taken generally along the line 5-5, illustrating the light assembly 18 of the handle 14. In certain embodiments, a bottom surface 84 of the light guide 22 (e.g., the arms 24 and 26) may include a plurality of castellations 86. The castellations 86 may have areas that contact the circuit board 46, as well as areas that are spaced apart from the circuit board 46. The castellations may improve the amount light transmitted to a top surface 88 of the light guide 22. In certain embodiments, the top surface 88 of the arms 22 and 24 of the light guide 22 and/or a side surface 90 of the arms 24 and 26 of the light guide 22 may be exposed (i.e., not covered or blocked by portions of the handle 14). Accordingly, the light guide 22 may be positioned within an unsealed area of the handle 14.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm". In an effort to avoid any ambiguity, for the purposes of this disclosure, the term "portion" shall be construed as meaning less than 50%. For example, the term "distal end portion" should be interpreted as from about 0%, 5%, 10%, or 15% to about 15%, 20%, 25%, 30%, 40% or 45% from the terminal end of the element referenced. Similarly, the term "proximal end portion" should be interpreted as from about 0%, 5%, 10%, or 15% to about 15%, 20%, 25%, 30%, 40% or 45% from the end opposite the terminal end of the element referenced.

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electronic personal care device comprising:

a housing defining a sealed cavity;

a power source positioned within the sealed cavity of the housing;

a first circuit board positioned within the sealed cavity of the housing;

a second circuit board positioned outside the sealed cavity and in electrical connection with the power source;

a light guide mounted to the second circuit board, the light guide having a body defining an opening; and a light source positioned within the opening, spaced apart from the light guide and mounted to the second circuit board, wherein a transparent layer is positioned around the light source and on the second circuit board forming a water tight seal.

2. The electronic personal care device of claim 1 wherein the transparent layer is positioned below a top surface of the body.

3. The electronic personal care device of claim 1 wherein the body comprises an upper rim.

4. The electronic personal care device of claim 1 wherein the transparent layer forms a watertight seal between the light source, the light guide and the second circuit board.

5. The electronic personal care device of claim 1 wherein a top surface of the light source is exposed.

6. The electronic personal care device of claim 1 wherein an inner bottom surface of the body of the light guide is spaced apart from the second circuit board.

7. The electronic personal care device of claim 1 wherein an outer rim of the body of the light guide is in direct contact with the second circuit board.

8. The electronic personal care device of claim 1 wherein the transparent layer is contained within the opening.

9. The electronic personal care device of claim 1 wherein the second circuit board is mounted to a platform.

10. The electronic personal care device of claim 9 wherein the light guide comprises a first pair of legs extending through a respective pair of openings in the second circuit board and the platform.

11. The electronic personal care device of claim 1 wherein a bottom surface of the light guide comprises a plurality of castellations.

12. An electronic personal care device comprising:

a handle having a housing defining a sealed cavity;

a power source positioned within the sealed cavity of the housing;

a first circuit board positioned within the cavity and operatively connected to the power source;

a second circuit board positioned outside the sealed cavity and in electrical connection with the power source;

a light guide mounted to the second circuit board, the light guide having a body defining an opening; and a light source positioned within the opening, spaced apart from the light guide and mounted to the second circuit board, wherein a transparent layer is positioned around the light source and on the second circuit board.

13. The electronic personal care device of claim 12 wherein the second circuit board is mounted to a platform.

14. The electronic personal care device of claim 12 wherein the body has an inner bottom surface spaced apart from the second circuit board.

15. The electronic personal care device of claim 14 wherein a bottom surface of an outer lower outer rim of the body directly contacts the second circuit board.

16. The electronic personal care device of claim 12 wherein the body comprises an upper rim.

17. A method of assembling an electronic personal care device comprising:

positioning a first circuit board within a sealed cavity;

positioning a power source within the sealed cavity;

electrically connecting the first circuit board to the power source;

mounting a light guide to a second circuit board positioned outside the sealed cavity;

mounting a light source to the second circuit board within an opening defined by a body of the guide;

electrically connecting the first circuit board to the second circuit board;

electrically connecting the light source to the second circuit board; and forming a transparent layer between the light source and the body.

18. The method of claim 17 further comprising surrounding the light source with the transparent layer.

19. The method of claim 18 positioning the transparent layer on the second circuit board.

20. The method of claim 17 further comprising securing the light guide to the platform.

* * * * *